United States Patent
Abe et al.

(10) Patent No.: US 7,502,488 B2
(45) Date of Patent: Mar. 10, 2009

(54) IMAGE PROCESSING APPARATUS, PROGRAM, AND STORAGE MEDIUM THAT CAN SELECTIVELY VARY EMBEDDING SPECIFICATION OF DIGITAL WATERMARK DATA

(75) Inventors: Yasushi Abe, Kanagawa (JP); Takahiro Yagishita, Kanagawa (JP); Yukio Kadowaki, Nara (JP); Takayuki Nishimura, Tattori (JP)

(73) Assignee: Ricoh Company, Ltd., Tokyo (JP)

( * ) Notice: Subject to any disclaimer, the term of this patent is extended or adjusted under 35 U.S.C. 154(b) by 620 days.

(21) Appl. No.: 10/760,082

(22) Filed: Jan. 15, 2004

(65) Prior Publication Data
US 2004/0208339 A1    Oct. 21, 2004

(30) Foreign Application Priority Data
Jan. 15, 2003   (JP) ............................. 2003-007106

(51) Int. Cl.
G06K 9/00   (2006.01)
G06K 9/36   (2006.01)

(52) U.S. Cl. ....................................... 382/100; 382/240
(58) Field of Classification Search .................. 382/100, 382/240
See application file for complete search history.

(56) References Cited

U.S. PATENT DOCUMENTS

| | | | |
|---|---|---|---|
| 6,449,380 B1 * | 9/2002 | Acharya et al. | 382/100 |
| 6,788,821 B2 | 9/2004 | Inoue et al. | |
| 6,990,213 B2 * | 1/2006 | Donescu | 382/100 |
| 2001/0033674 A1 * | 10/2001 | Chen et al. | 382/100 |
| 2002/0009208 A1 * | 1/2002 | Alattar et al. | 382/100 |
| 2002/0031240 A1 * | 3/2002 | Levy et al. | 382/100 |
| 2002/0051560 A1 * | 5/2002 | Donescu et al. | 382/100 |

(Continued)

FOREIGN PATENT DOCUMENTS

JP    10-155151    6/1998

(Continued)

OTHER PUBLICATIONS

Jue Wang, May 2001, IEEE, Consumer Electronics IEEE Transactions on, vol. 47 Issue:2, 257-262.*

(Continued)

*Primary Examiner*—Jingge Wu
*Assistant Examiner*—Max Shikhman
(74) *Attorney, Agent, or Firm*—Blakely, Sokoloff, Taylor & Zafman LLP

(57) ABSTRACT

An image processing apparatus includes a wavelet transform unit that performs compression encoding in a hierarchical manner by performing discrete wavelet transform on pixel values for each of one or more rectangular regions dividing image data. A digital watermark obtaining unit obtains digital watermark data to be embedded into wavelet coefficients generated by the wavelet transform unit. A characteristics extracting unit extracts characteristics of the wavelet coefficients for each of the rectangular regions. An embedding specification determination unit determines an embedding specification of the digital watermark data with respect to the wavelet coefficients in accordance with the characteristics of the wavelet coefficients for each of the rectangular regions that are extracted by the characteristics extracting unit. A digital watermark embedding unit embeds into the wavelet coefficients the digital watermark data for each of the rectangular regions in accordance with the embedding specification of each of the rectangular regions.

4 Claims, 15 Drawing Sheets

U.S. PATENT DOCUMENTS

| | | | |
|---|---|---|---|
| 2002/0059520 A1* | 5/2002 | Murakami et al. | 713/176 |
| 2002/0083324 A1* | 6/2002 | Hirai | 713/176 |
| 2002/0157005 A1* | 10/2002 | Brunk et al. | 713/176 |
| 2003/0161496 A1* | 8/2003 | Hayashi et al. | 382/100 |
| 2004/0047489 A1* | 3/2004 | Seo et al. | 382/100 |

FOREIGN PATENT DOCUMENTS

| | | |
|---|---|---|
| JP | 2001-11973 | 4/2001 |
| JP | 2001-111973 | 4/2001 |
| JP | 2001-320569 | 11/2001 |
| JP | 2001-320578 | 11/2001 |
| JP | 2002-094780 | 3/2002 |

OTHER PUBLICATIONS

Lumini, "Wavelet-based Image Watermarking Scheme", 2000, Information Technology: Coding and Computing pp. 122-127.*

"Investigative Report of Digital Watermark Technology Mar. 1999," Japanese Electronic Industry Development Association, editors, pp. 1-37, 50-63, 72-87, 94-99 (and table of contents).

Japanese Office Action, Notice of Rejection of Japanese Patent Application No. JP2003-007106, Issue Date Jul. 24, 2007 (2 pages).

* cited by examiner

DECOMPOSITION LEVEL 0

DECOMPOSITION LEVEL 1

DECOMPOSITION LEVEL 2

DECOMPOSITION LEVEL 3

FIG.5B
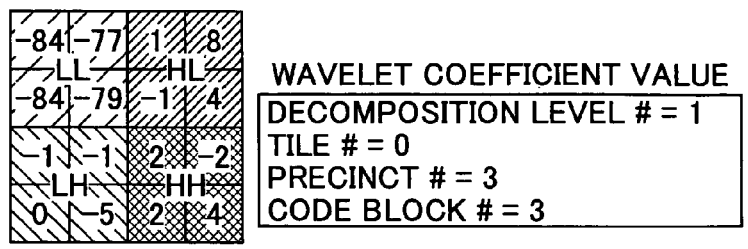
WAVELET COEFFICIENT VALUE
DECOMPOSITION LEVEL # = 1
TILE # = 0
PRECINCT # = 3
CODE BLOCK # = 3
FIG.5C
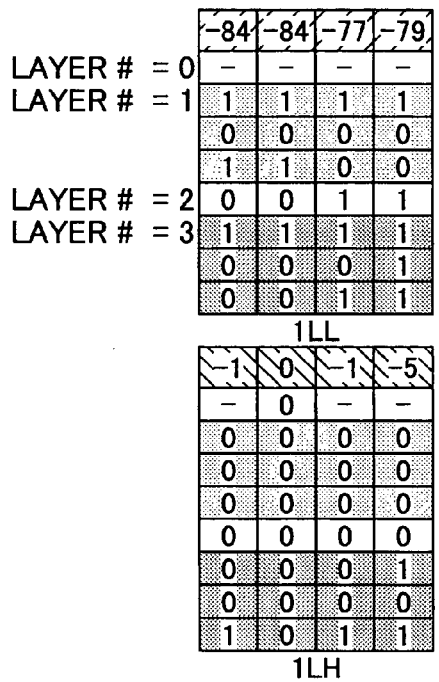
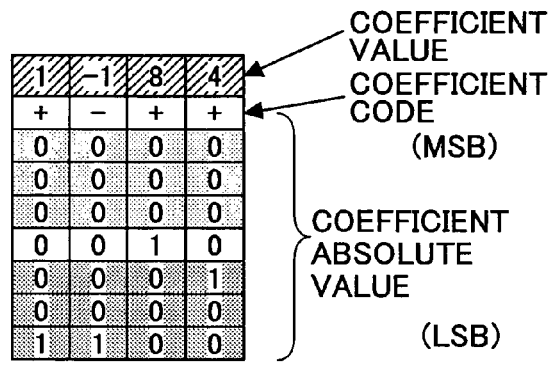
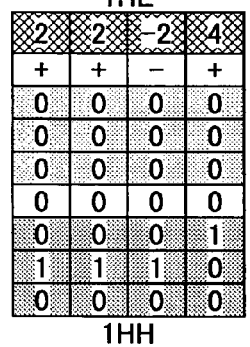

IMAGE PROCESSING APPARATUS, PROGRAM, AND STORAGE MEDIUM THAT CAN SELECTIVELY VARY EMBEDDING SPECIFICATION OF DIGITAL WATERMARK DATA

The present application claims priority to the corresponding Japanese Application No. 2003-007106 filed on Jan. 15, 2003, the entire contents of which are hereby incorporated by reference.

BACKGROUND OF THE INVENTION

1. Field of the Invention

The present invention relates to image processing apparatuses, programs, and storage media.

2. Description of the Related Art

Digital information (digital content) such as digital images can be easily copied by, for example, computers without degrading the information. Recently, as digital image technology has developed, it is also becoming possible to use digital images and the like obtained by, for example, a digital camera as evidential pictures. Some of such digital contents are copyrighted, and copying of them is prohibited without permission or reusing of copied digital content.

Digital content can be easily tampered by performing thereon a simple modifying process, for example, and rewriting them. For this reason, sometimes, digital content is illegally copied and reused without permission, or partially tampered so that the digital contents cannot be used as evidential pictures. Therefore, as for measures to deal with such problems, there are techniques for preventing illegal use of digital contents by methods referred to as digital watermark and data hiding, for example, which methods add into the digital contents (digital images, for example) information that cannot be seen when the digital contents are normally reproduced. With such techniques, based on digital watermarks embedded in the digital contents, it is possible to determine whether digital contents are illegally used.

Applications of such digital watermarks embedded in digital content are as follows.

A. recording of copyright information
B. tracing of illegal copier information
C. recording history of IP address
D. prevention of illegal copy: invisible/high resistance type
E. application for preventing tampering: invisible/low resistance type
F. authentication
G. secret communication
H. embed remarks and labels of digital contents for displaying owner
I. enabling elimination of watermark: visible/reversible type . . . contents distribution Among the above-mentioned applications, the following technique is devised as the application for realizing "E. application for preventing tampering" which aims at protecting the rights of an auteur of contents.

For example, there is a technique of embedding the serial number of a digital camera and the date and time of photography in a photographed digital image and creating a digital signature, when taking a picture by the digital camera. By utilizing a digital watermark technique in addition to detection of tampering which has been possible by the technology of digital signatures, it is possible to detect whether a digital image is tampered and identify a digital camera that takes a picture and the date and time of photography. Accordingly, it is possible to more effectively prevent tampering of digital images (see, for example, "Investigative Report of Digital Watermark Technology March 1999," edited by Japanese Electronic Industry Development).

As for technology for embedding a digital watermark in digital contents (hereinafter referred to as "digital watermark technology"), a method is proposed that embeds digital watermark information in spatial frequency data resulting from orthogonal conversion (see Japanese Patent Gazette No. 3109575, for example).

The technology for embedding digital watermark information in spatial frequency data has characteristics by which good effects are obtained when processing and compressing digital contents in which a digital watermark is embedded, though process load of embedding and extracting digital watermark information with respect to digital contents may be heavy.

In recent years, JPEG 2000, which is a new method capable of restoring a high-quality image even at a high compression rate, is being standardized as one image compression method that realizes a high-definition image. According to JPEG 2000, it is possible to perform a compression/decompression process with limited memory by dividing an image into rectangular regions (tiles). That is, each tile constitutes a basic unit when the compression/decompression process is carried out, and a compression/decompression operation can be performed independently for each tile.

However, according to the technology described in Japanese Patent Gazette No. 3109575, the embedding specification such as intensity of digital watermark data is predetermined in a fixed manner. For this reason, even in a case where regions that allow degradation of image quality due to embedding of digital watermark data and regions that do not are mixed, it is impossible to vary the embedding specification of digital watermark data between the regions that allow degradation of image quality and the regions that do not. Hence, there is a problem in that image degradation of partial regions occurs as a result of embedding of digital watermark data in digital contents.

SUMMARY OF THE INVENTION

An image processing apparatus, program, and storage medium that can selectively vary embedding specification of digital watermark data are described. In one embodiment, the image processing apparatus comprises: a wavelet transform unit that performs compression encoding in a hierarchical manner by performing discrete wavelet transform on pixel values for each of one or more rectangular regions dividing image data; a digital watermark obtaining unit that obtains digital watermark data to be embedded into wavelet coefficients generated by the wavelet transform unit; a characteristics extracting unit that extracts characteristics of the wavelet coefficients for each of the rectangular regions; an embedding specification determination unit that determines an embedding specification of the digital watermark data with respect to the wavelet coefficients in accordance with the characteristics of the wavelet coefficients for each of the rectangular regions which characteristics are extracted by the characteristics extracting unit; and a digital watermark embedding unit that embeds into the wavelet coefficients the digital watermark data for each of the rectangular regions in accordance with the embedding specification of each of the rectangular regions determined by the embedding specification determination unit.

BRIEF DESCRIPTION OF THE DRAWINGS

FIGS. 5A, 5B and 5C are schematic diagrams for illustrating a procedure for placing bit planes in order;

FIG. 11 10 is a flow chart for illustrating processes in the digital watermark embedding unit according to one embodiment of the present invention;

DETAILED DESCRIPTION OF THE PREFERRED EMBODIMENTS

Figure 1:
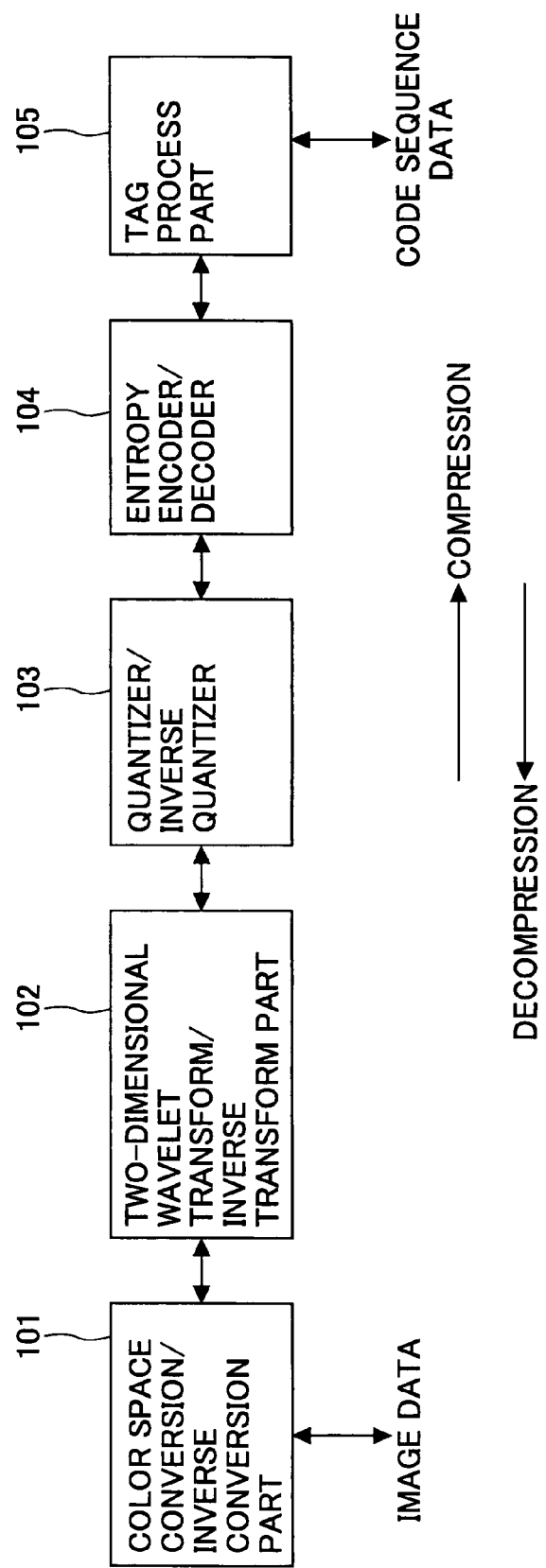
FIG. 1 is a function block diagram of a system that realizes a hierarchical coding algorithm, which forms the basis of JPEG 2000 on which one embodiment of the present invention is based.

One or more embodiments of the present invention include an improved and useful image processing apparatus, program, and storage medium in which one or more of the above-mentioned problems are eliminated.

Other and more specific embodiments of the present invention include an image processing apparatus, a program, and a storage medium that can selectively vary an embedding specification of digital watermark data.

In order to achieve the above-mentioned embodiments, according to one embodiment of the present invention, an image processing apparatus comprises: a wavelet transform unit that performs compression encoding in a hierarchical manner by performing discrete wavelet transform on pixel values for each of one or more rectangular regions dividing image data; a digital watermark obtaining unit that obtains digital watermark data to be embedded into wavelet coefficients generated by the wavelet transform unit; a characteristics extracting unit that extracts characteristics of the wavelet coefficients for each of the rectangular regions; an embedding specification determination unit that determines an embedding specification of the digital watermark data with respect to the wavelet coefficients in accordance with the characteristics of the wavelet coefficients for each of the rectangular regions which characteristics are extracted by the characteristics extracting unit; and a digital watermark embedding unit that embeds into the wavelet coefficients the digital watermark data for each of the rectangular regions in accordance with the embedding specification of each of the rectangular regions determined by the embedding specification determination unit.

According to another embodiment of the present invention, an image processing apparatus comprises: a characteristics extracting unit that extracts characteristics of wavelet coefficients of one or a plurality of rectangular regions dividing an image; an embedding specification determination unit that determines, in accordance with the extracted characteristics of the wavelet coefficients for each rectangular region, an embedding specification of digital watermark data with respect to the wavelet coefficients; and a digital watermark embedding unit that embeds the digital watermark data into the wavelet coefficients for each rectangular region in accordance with the embedding specification of each rectangular region.

Accordingly, the characteristics of wavelet coefficients are extracted for each rectangular region dividing image data into one or a plurality of regions, the embedding specification of digital watermark data with respect to the wavelet coefficients is determined in accordance with the extracted characteristics of the wavelet coefficients of each rectangular region, and the digital watermark data are embedded into the wavelet coefficients for each rectangular region in accordance with the embedding specification of each rectangular region. Hence, in a case where a region that allows degradation of image quality caused by embedding a digital watermark and a region that does not are mixed in one image, it is possible to selectively vary the embedding specification of digital watermark data (for example, the embedding intensity of digital watermark data) in the region that allows degradation of image quality and the region that does not.

In the above-mentioned image processing apparatus, the embedding specification determination unit may determine the embedding intensity of the digital watermark data with respect to the wavelet coefficients of each of the rectangular regions in accordance with frequency components included in each of the rectangular regions.

Accordingly, for example, when a rectangular region includes a lot of high frequency components, it is possible to make the embedding intensity of digital watermark data stronger compared to the case where a lot of low-frequency components are included, since, for example, from general human visual perception characteristics, it is difficult for variation in edge parts, many of which are included in high-frequency components, to be conspicuous.

Additionally, the embedding specification determination unit may determine the embedding intensity of the digital watermark data with respect to the wavelet coefficients of each of the rectangular regions depending on whether each of the rectangular regions includes a ROI (region of interest).

Accordingly, for example, when a rectangular region includes an ROI, it is possible to make the embedding intensity of digital watermark data weaker, since the image quality of the rectangular regions is relatively improved compared to the other parts, and it is therefore desirable to maintain the image quality.

Additionally, the embedding specification determination unit may determine the amount of embedding information of the digital watermark data with respect to the wavelet coefficients of each of the rectangular regions in accordance with frequency components included in each of the rectangular regions.

Accordingly, for example, when a rectangular region includes a lot of high-frequency components, it is possible to increase the amount of embedding information of digital watermark data compared to the case where a lot of low-frequency components are included, since, from general human visual perception characteristics, it is difficult for variation in edge parts, many of which are included in high-frequency components, to be conspicuous.

Additionally, the embedding specification determination unit may vary, for each of the rectangular regions, a subband that becomes the target into which the digital watermark data are embedded.

Accordingly, for example, when image quality is important, it is possible to reduce degradation of image quality by embedding digital watermark data into wavelet coefficients of a HH subband, which is a high-frequency component, since, in high-frequency components, degradation of image quality at decoding is small even if data are reduced.

Additionally, the embedding specification determination unit may vary, for each of the rectangular regions, wavelet coefficients that become targets into which the digital watermark data are embedded.

Accordingly, it is possible to increase confidentiality.

Additionally, another embodiment of the present invention comprises an article of manufacture having one or more recordable media with a program stored thereon installed on or interpreted by a computer and executed by the computer, the program causing the computer to perform: a wavelet transform function that performs compression encoding in a hierarchical manner by performing discrete wavelet transform on pixel values for each of one or more rectangular regions dividing image data; a digital watermark obtaining function that obtains digital watermark data to be embedded into wavelet coefficients generated by the wavelet transform unit; a characteristics extracting function that extracts characteristics of the wavelet coefficients for each of the rectangular regions; an embedding specification determination function that determines an embedding specification of the digital watermark data with respect to the wavelet coefficients in accordance with the characteristics of the wavelet coefficients for each of the rectangular regions which characteristics are extracted by the characteristics extracting unit; and a digital watermark embedding function that embeds into the wavelet coefficients the digital watermark data for each of the rectangular regions in accordance with the embedding specification of each of the rectangular regions determined by the embedding specification determination unit.

Additionally, according to another embodiment of the present invention, there is provided a computer-readable storage medium storing the above-mentioned program.

Additionally, another embodiment of the present invention comprises an article of manufacture having one or more recordable media with a program stored thereon installed on or interpreted by a computer and executed by the computer, the program causing the computer to perform: a characteristics extracting function that extracts characteristics of wavelet coefficients of one or a plurality of rectangular regions dividing an image; an embedding specification determination function that determines, in accordance with the extracted characteristics of the wavelet coefficients for each rectangular region, an embedding specification of digital watermark data with respect to the wavelet coefficients; and a digital watermark embedding function that embeds the digital watermark data into the wavelet coefficients for each rectangular region in accordance with the embedding specification of each rectangular region.

Additionally, according to another embodiment of the present invention, there is provided a computer-readable storage medium storing the above-mentioned program.

According to the above-mentioned embodiments of the present invention, the characteristics of wavelet coefficients are extracted for each rectangular region dividing image data into one or a plurality of regions, the embedding specification of digital watermark data with respect to the wavelet coefficients is determined in accordance with the extracted characteristics of the wavelet coefficients of each rectangular region, and the digital watermark data are embedded into the wavelet coefficients for each rectangular region in accordance with the embedding specification of each rectangular region. Hence, in a case where a region that allows degradation of image quality caused by embedding a digital watermark and a region that does not are mixed in one image, it is possible to selectively vary the embedding specification of digital watermark data (for example, the embedding intensity of digital watermark data) in the region that allows degradation of image quality and the region that does not.

Other embodiments, features and advantages of the present invention will become more apparent from the following detailed description when read in conjunction with the following drawings.

Referring to FIGS. 1 through 9, a description will be given of one embodiment of the present invention.

First, a description will be given of the outlines of "progressive coding algorithm" and "JPEG 2000 algorithm" on which this embodiment is based.

FIG. 1 is a function block diagram of a system that realizes a progressive coding algorithm, which forms the basis of the JPEG 2000 method. The system comprises a color space conversion/inverse conversion unit 101, a two-dimensional wavelet transform/inverse transform unit 102, a quantization/inverse quantizer 103, an entropy coder/decoder 104, and a tag process unit 105.

One of the major differences between the system and conventional JPEG algorithms is a conversion method. In JPEG, discrete cosine transform (DCT) is used. On the other hand, in the progressive coding algorithm, a discrete wavelet transform is used in the two-dimensional wavelet transform/inverse transform unit 102. DWT has an advantage in that image quality in high compression regions is better than that of DCT. This is one of the main reasons that DWT is adopted in JPEG 2000, which is the successor algorithm of JPEG.

Additionally, another difference is that the tag process unit 105 is added for performing code formation at the final processing stage of the system. At a compression operation of an image, compressed data are generated as code sequence data in the tag process unit 105. In the tag process unit 105, at the time of a compression operation of an image, compressed data are generated as code sequence data, and at the time of a decompression operation, interpretation of code sequence data necessary for decompression is performed. Code sequence data allows JPEG 2000 to realize various useful functions. For example, it becomes possible to freely stop a compression/decompression operation of a still image at any layer (decomposition level) corresponding to octave division in block-based DWT (refer to FIG. 3, which is described later).

In many cases, the color space conversion/inverse conversion unit 101 is connected to an input/output unit of an original image. A unit that performs conversion or inverse conversion to the YUV or YCbCr color system from the RGB color system or the YMC color system corresponds to the input/output unit. The RGB color system includes respective components of R (red), G (green), and B (blue) of the primary color system. The YMC color system includes respective components of Y (yellow), M (magenta), and C (cyan) of the complementary color system.

Figure 2:
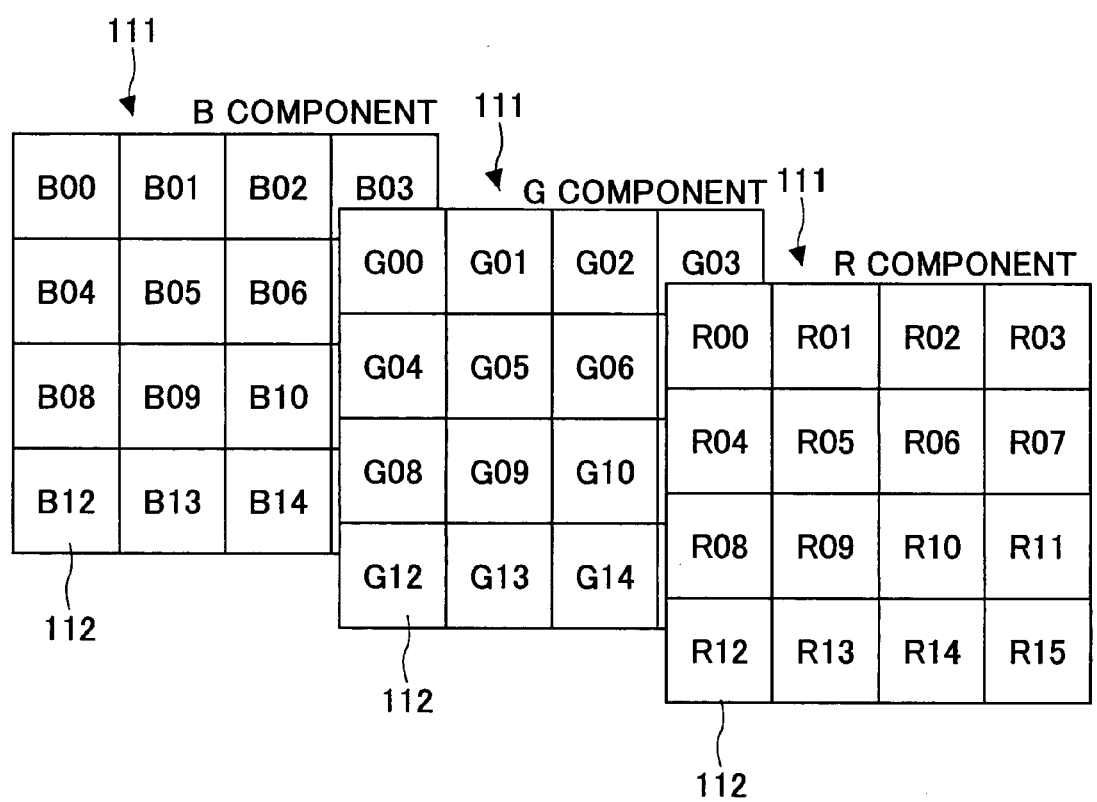
FIG. 2 is a schematic diagram showing rectangular regions dividing each component of an original image.
Figure 3A:
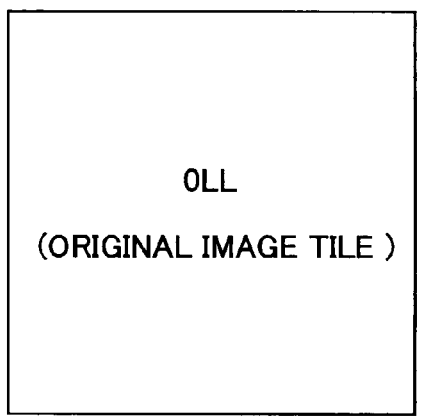
FIGS. 3A, 3B, 3C and 3D are schematic diagrams showing subbands at respective decomposition levels when the number of decomposition levels is three.
Figure 3B:
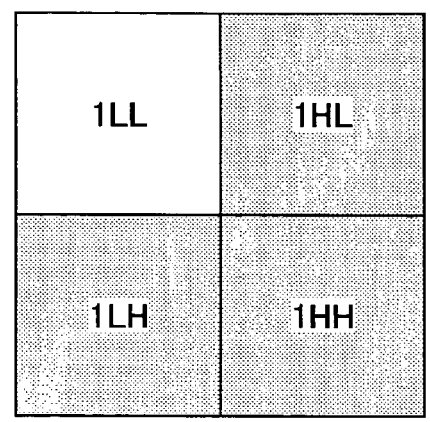
Figure 3C:
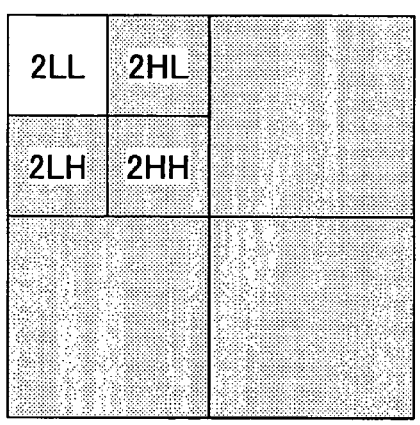
Figure 3D:
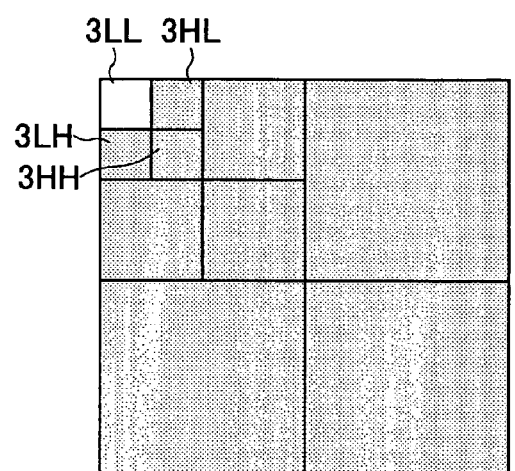

As shown in FIG. 2, generally, each component 111 (here, the RGB primary color system is adopted) of an original image that is a color image is divided by rectangular regions. The rectangular regions are generally called blocks or tiles. In JPEG 2000, the rectangular regions are generally called tiles. Hence, hereinafter such rectangular regions are referred to as tiles (in the example shown in FIG. 2, each component 111 is divided into a total of 16 (4×4) rectangular tiles 112). Each of the tiles 112 (R00, R01, ..., R15, G00, G01, ..., G15, B00, B01, ..., B15 in the example shown in FIG. 2) serves as a basic unit when a compression/decompression process of image data is carried out. Accordingly, the compression/decompression operation of image data is independently performed on each component 111 or each of the tiles 112.

When coding image data, data of each tile 112 of each component 111 are input to the color space conversion/inverse conversion unit 101 shown in FIG. 1 and subjected to color space conversion. Then, the data are subjected to a two-dimensional wavelet transform (forward conversion) in the two-dimensional wavelet transform/inverse transform unit 102, and spatially divided into frequency bands.

FIGS. 3A through 3D show subbands at respective decomposition levels in the case where the number of decomposition levels is three. That is, two-dimensional wavelet transform is performed on an original image tile (0LL) (decomposition level 0) obtained by tile division of an original image. Thereby, the original image tile is divided into subbands (1LL, 1HL, 1LH, and 1HH)(decomposition level 1) shown in FIG. 3B. Subsequently, two-dimensional wavelet transform is performed on the low-frequency component 1LL in this layer, thereby dividing the component 1LL into subbands (2LL, 2HL, 2LH, and 2HH)(decomposition level 2) shown in FIG. 3C. Similarly, two-dimensional wavelet transform is also performed on the low-frequency component 2LL, thereby dividing the component 2LL into subbands ( ) shown in FIG. 3D. In FIGS. 3A through 3D, the target subband for coding at each decomposition level is represented by hatching. When the number of decomposition levels is three, for example, the hatched subbands (3HL, 3LH, 3HH, 2HL, 2LH, 2HH, 1HL, 1LH, and 1HH) are targets for coding. The 3LL subband is not coded.

Then, target bits of coding are defined in a designated coding order, and a context is generated by the quantization/inverse quantizer 103 shown in FIG. 1 from bits neighboring target bits.

Figure 4:
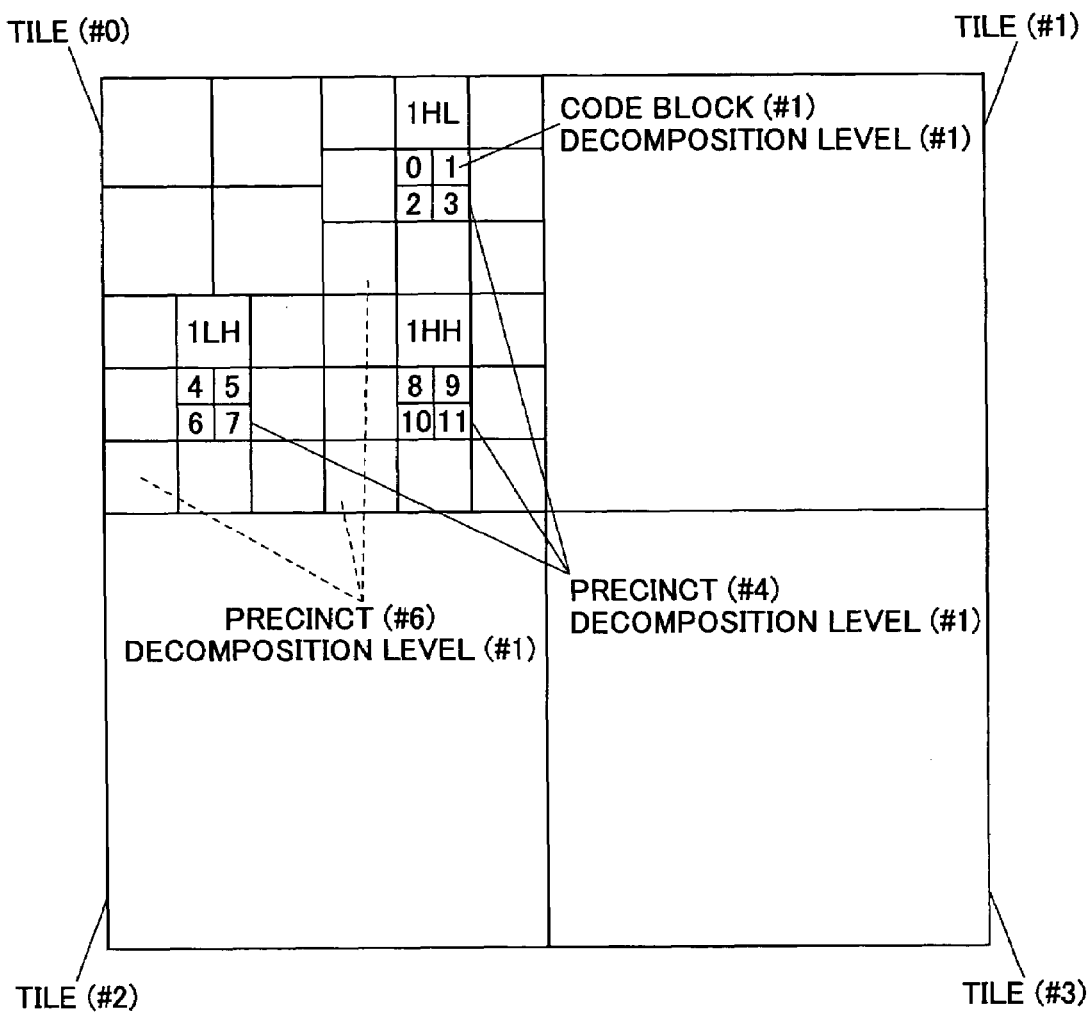
FIG. 4 is a schematic diagram for illustrating precincts.

Wavelet coefficients subjected to the quantization are divided into rectangular regions called "precincts" that do not overlap each other for each subband. The precincts are adopted for efficiently using a memory in implementation. As shown in FIG. 4, one precinct is formed by three rectangular regions that spatially match. In addition, each precinct can be divided into rectangular "code blocks" that do not overlap each other. The code block serves as a basic unit when entropy coding is performed.

The wavelet coefficient value after the wavelet transform may be directly quantized and coded. In JPEG 2000, however, in order to improve coding efficiency, it is possible to decompose the coefficient value into "bit planes," and place the "bit planes" in order for each pixel or code block.

Figure 5A:
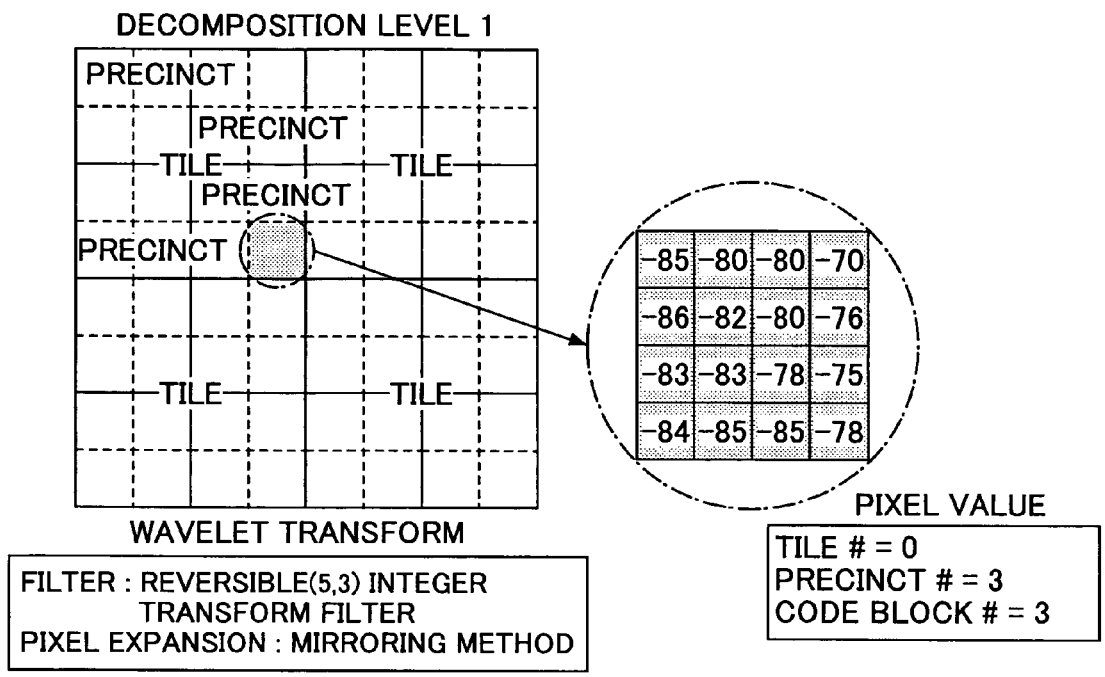

FIGS. 5A through 5C are schematic diagrams for illustrating a procedure for placing the bit planes in the order. As shown in FIG. 5A, in this example, an original image (32×32 pixels) is divided by four tiles each having 16×16 pixels. The sizes of the precinct and code block at the decomposition level 1 are 8×8 pixels and 4×4 pixels, respectively. The precincts and code blocks are numbered in the raster order. In this example, the precincts are numbered from 0 to 3, and the code blocks are numbered from 0 to 3. The wavelet coefficient value is obtained by using a mirroring method for pixel expansion with respect to the outside of the tile borders, and performing wavelet transform with a reversible filter.

FIGS. 5B and 5C show the concept of a typical "layer" structure of the tile 0/precinct 3/code block 3. The code block after conversion is divided into subbands (1LL, 1HL, 1LH, and 1HH). Wavelet coefficient values are assigned to each of the subbands.

The structure of a layer is easily understood when the wavelet coefficient values are seen from the lateral direction (bit plane direction). One layer includes an arbitrary number of bit planes. In this example, layers 0, 1, 2, and 3 include one bit plane, three bit planes, one bit plane, and three bit planes, respectively. The closer a bit plane in a layer is to the LSB (Least Significant Bit), the earlier the layer becomes the target for quantization. Conversely, the close a bit plane in a layer is to the MSB (Most Significant Bit), the later the layer becomes the target for quantization. A method of discarding layers that are close to the LSB is called truncation, which can finely control the quantization ratio.

The entropy coder/decoder 104 shown in FIG. 1 performs coding of the tiles 112 of each component 111 by probability estimation based on the context and target bits. The coding process is performed for each tile 112 of all components 111 of the original image. At last, the tag process unit 105 combines all coded data from the entropy coder/decoder 104 into a sequence of code sequence data (codestream), and performs a process for adding a tag thereto.

Figure 6:
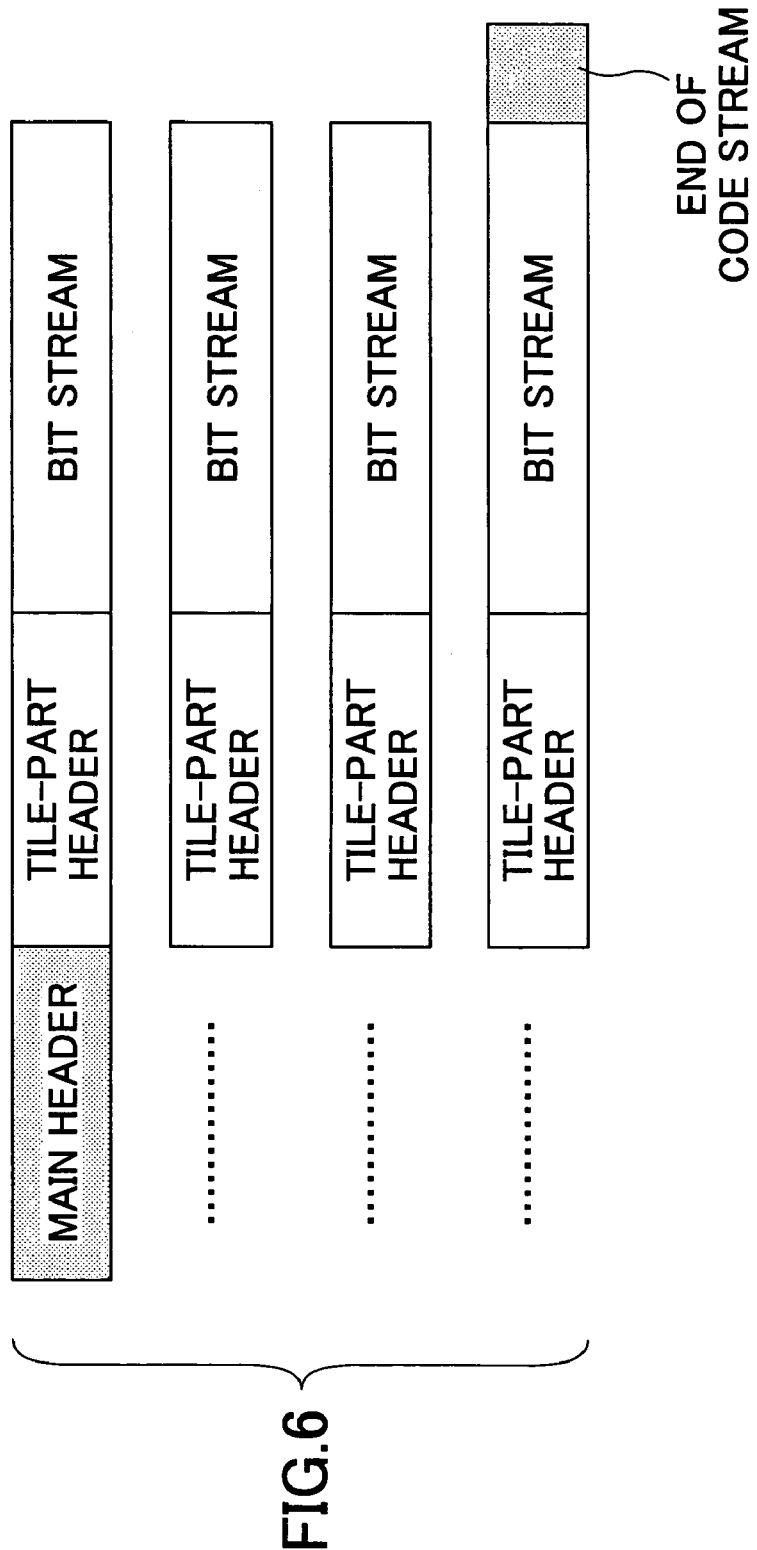
FIG. 6 is a schematic diagram for illustrating a schematic structure of code sequence data for one frame.

FIG. 6 shows a schematic structure of the code sequence data for one frame. Tag information called a header (main header, tile part header that is tile border position information, the tile border direction information, and the like) is added to the head of the code sequence data and the head of coded data (bit stream) of each tile. Coded data of each tile follows the header. A tag (end of codestream) is put at the end of the code sequence data.

On the other hand, at the time of decoding, image data are generated from code sequence data of each tile 112 of each component 111, which is the reverse of the coding of image data. In this case, the tag process unit 105 interprets tag information added to code sequence data that are input from the outside, decomposes the code sequence data into code sequence data of each tile 112 of each component 111, and performs a decoding process (decomposition process) for the code sequence data of each tile 112. On this occasion, the positions of bits that become targets for decoding are determined in an order based on the tag information in the code sequence data. Also, the quantization/inverse quantizer 103 generates context based on the arrangement of the bits (that are already decoded) around the target bit positions. The entropy coder/decoder 104 performs decoding by probability estimation based on the context and code sequence data, thereby generating target bits and writing the target bits to the target bit positions. The data thus decoded are spatially divided by frequency band. Hence, by performing a two-dimensional wavelet transform on the data by use of the two-dimensional wavelet transform/inverse transform unit 102, each tile of each component of the image data is reconstructed. The reconstructed data are converted to image data of the original color system by the color space conversion/inverse conversion unit 101.

The outline of the "JPEG 2000 algorithm" is described above.

A description is given below of one embodiment of the present invention. It should be noted that, here, an example relating to image compression/decompression techniques as represented by JPEG 2000 is described. However, the present invention is not limited to the following description.

Figure 7:
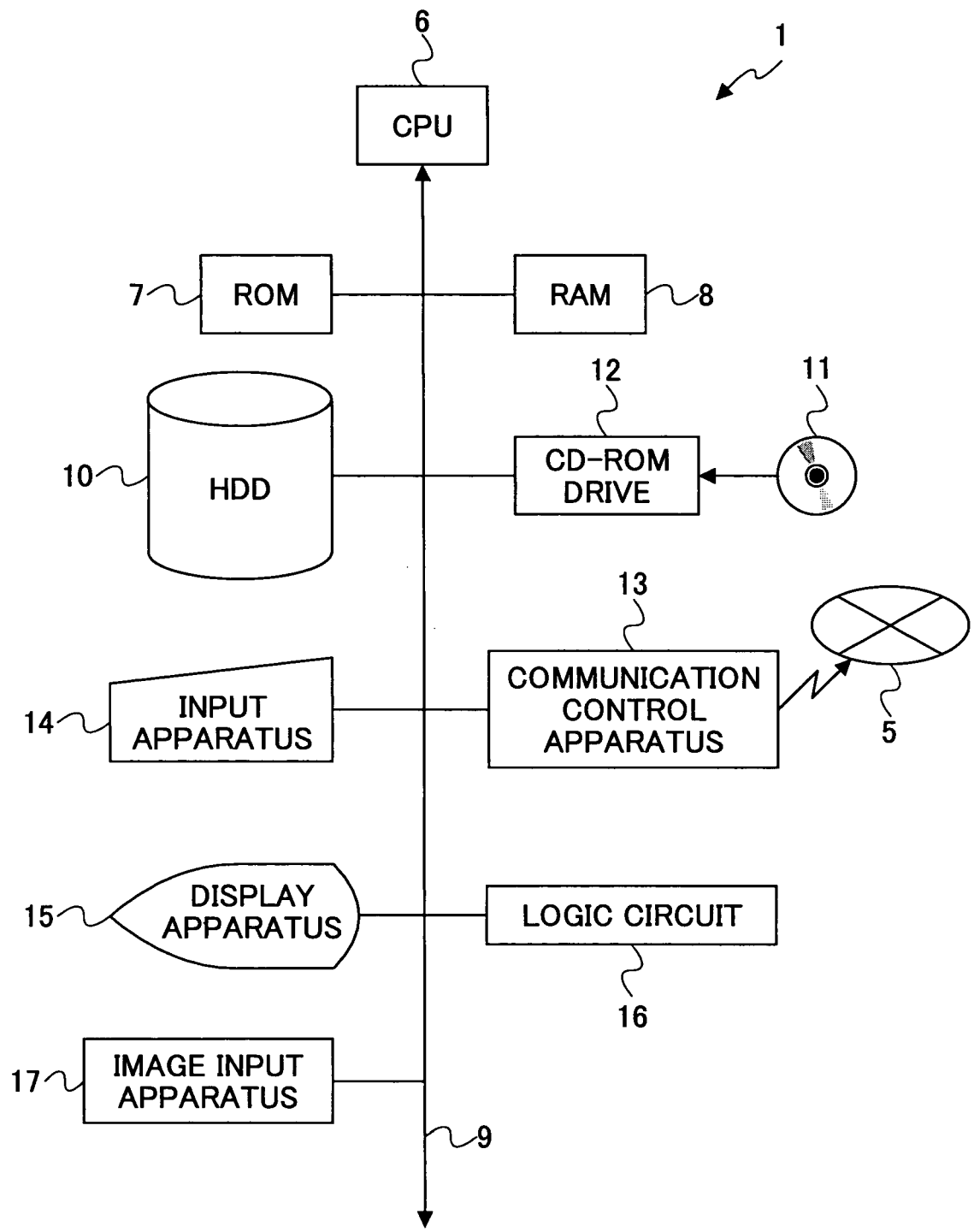
FIG. 7 is a block diagram schematically showing a hardware configuration of an image processing apparatus according to one embodiment of the present invention.

FIG. 7 is a block diagram schematically showing one embodiment of a hardware configuration of an image processing apparatus 1. As shown in FIG. 7, the image processing apparatus 1 is provided with a CPU (central processing unit) 6 that is the main part of a computer and controls each unit in a centralized manner. The CPU 6 is connected via a bus 9 to a ROM 7 that is a read only memory storing BIOS and the like, and to a RAM (random access memory) that stores various data in a rewritable manner. Since the RAM 8 has the property of storing various data in a rewritable manner, the RAM 8 serves as a working memory for the CPU 6, and acts as an input buffer, for example.

Additionally, a HDD (hard disk drive) 10, a CD-ROM drive 12, a communication control apparatus 13, an input apparatus 14, a display apparatus 15, and an image input apparatus 17 are connected to the bus 9 via I/Os (not shown). The HDD 10 serves also as a digital watermark data storing unit 28 (refer to FIG. 8) for storing digital watermark data, which is described later. The CD-ROM drive 12 reads a CD (compact disk)—ROM 11 as an apparatus for reading computer software, which is a distributed program. The communication control apparatus 13 controls communication between the image processing apparatus 1 and an external network 5. The input apparatus 14 represents a keyboard and a mouse, for example. The display apparatus 15 is a CRT (cathode ray tube) or a LCD (liquid crystal display). The image input apparatus 17 is an image scanner, a digital camera, or the like, which inputs an image. Further, a logical circuit 16 is also connected to the CPU 6 via the bus 9.

The CD-ROM 11 embodies a storage medium according to one embodiment of the present invention, and an OS (operating system) or various computer software is stored thereon. The CPU 6 reads the computer software stored on the CD-ROM 11 by use of the CD-ROM drive 12, and installs the computer software to the HDD 10.

In addition to the CD-ROM 11, various types of media may be used as the storage medium: various optical disks such as DVDs, various magnetic disks such as magnetic optical disks and flexible disks, and semiconductor memories. Further, computer software may be downloaded and installed to the HDD 10 from the network 5 such as the Internet via the communication control apparatus 13. In this case, a storage device that is provided in a server of the transmitting source and stores the computer software is also included in the storage medium according to one embodiment of the present invention. The computer software may be operated on a predetermined OS (operating system). In this case, the software may cause the OS to carry out a part of various processes that are described later. Additionally, the software may be included as a part of a group of program files composing a predetermined application software or OS.

The HDD 10 of the image processing apparatus 1 having the above-mentioned configuration stores, as computer software, an image processing program that processes images. This image processing program embodies the program according to one embodiment of the present invention. Various functions of respective parts of the image processing apparatus 1 are realized by processes carried out by the CPU 6 based on the image processing program. Additionally, in the case where real-time performance is regarded as important, it is necessary to speed up the processes. In order to do so, it is desirable that the various functions of respective units be realized by operations of the logic circuit 16.

A description is given below of the various functions that are realized by the processes carried out by the CPU 6 based on the image processing program.

Figure 8:
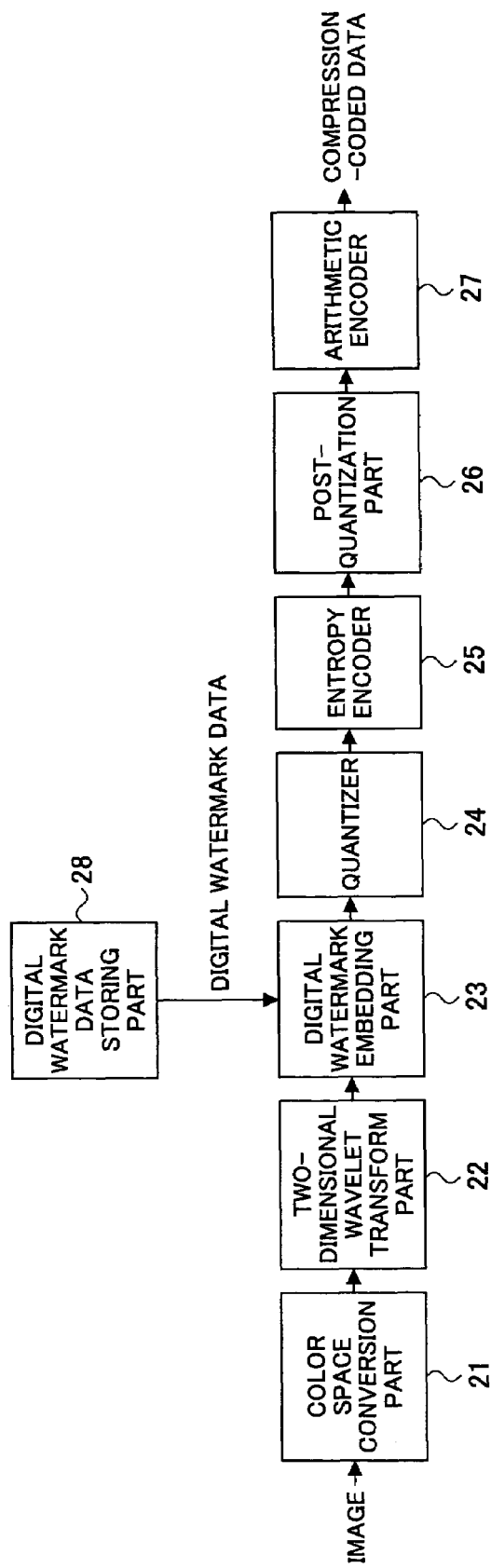
FIG. 8 is a function block diagram showing the functions realized by processes that are carried out by a CPU based on an image processing program.

FIG. 8 is a block diagram showing functions that are realized by the processes performed by the CPU 6 based on the image processing program. As shown in FIG. 8, in the image processing apparatus 1, the functions of a color space conversion unit 21, a two-dimensional wavelet transform unit 22, a digital watermark embedding unit 23, a quantizer 24, an entropy encoder 25, a post-quantizer 26, an arithmetic encoder 27, and a digital watermark storing unit 28 are realized by the processes carried out by the CPU 6 based on the image processing program.

A brief description is given below of each function block. The color space conversion unit 21 converts an image signal that is input from the image input apparatus 17 to YUV or YCbCr from RGB. The two-dimensional wavelet transform unit 22 performs a two-dimensional wavelet transform for each color component. Then, the digital watermark embedding unit 23 embeds digital watermark data stored in the digital watermark storing unit 28 in a wavelet coefficient. The quantizer 24 divides the wavelet coefficient by an appropriate quantization denominator. The entropy encoder 25 creates loss-less codes. The post-quantizer 26 performs bit truncation (discard of codes). The arithmetic encoder 27 forms the codes into the code formats of JPEG 2000. With a series of the above-mentioned processes, image data of each of the components R, G, and B of the original image are divided into one or more (normally, a plurality of) tiles for each frame. Compression coding is performed on each tile in a hierarchical manner. Thereby, compression-coded data are generated.

Figure 9:
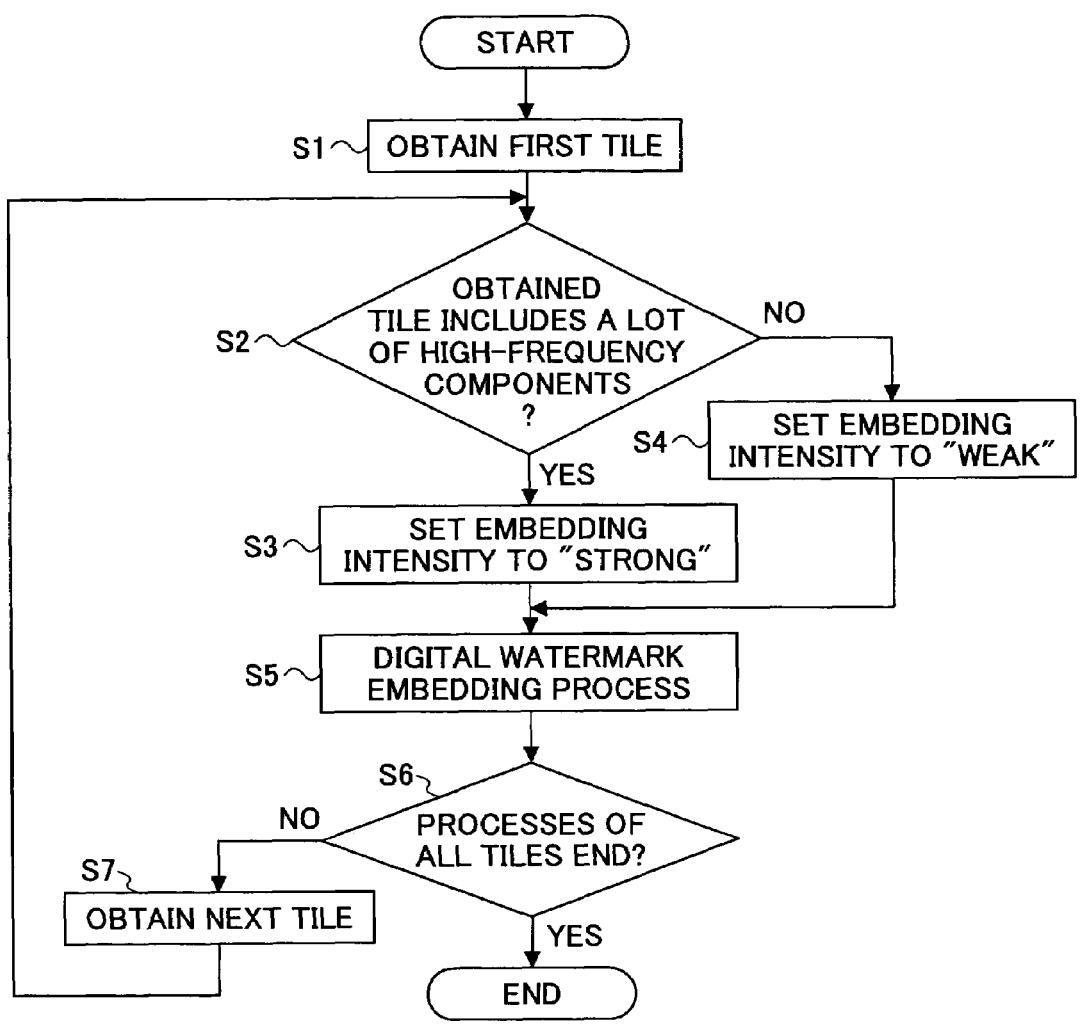
FIG. 9 is a flow chart for illustrating processes in a digital watermark embedding unit.

Referring to FIG. 9, a description is given of processes in the digital watermark embedding unit 23, which fulfills functions characteristic of this embodiment. As shown in FIG. 9, in step S1, a first tile is obtained from those tiles that are subjected to two-dimensional wavelet transform by the two-dimensional wavelet transform unit 22. Then, the process proceeds to step S2.

In step S2, it is determined whether the obtained tile includes a lot of high-frequency components (i.e., when the image includes a lot of edge parts). Here, the function of characteristics extraction units is carried out.

When the obtained tile includes a lot of high-frequency components (YES in step S2), the process proceeds to step S3. In step S3, the embedding intensity of digital watermark is set to "strong." On the other hand, when the obtained tile does not include a lot of high-frequency components (NO in step S2), the process proceeds to step S4. In step S4, the embedding intensity of digital watermark is set to "weak." In other words, the functions of embedding specification determination units are carried out by the processes of steps S3 and S4.

Since techniques for varying the embedding intensity of digital watermark are well known, a detailed description thereof is omitted. Schematically, however, when the embedding intensity of digital watermark is "strong," the quantization width is increased. When the embedding intensity of digital watermark is "weak," the quantization width is decreased. When the embedding intensity of digital watermark is "strong," by increasing the quantization width, characteristics are exhibited that noise of a digital watermark per se degrades image quality; however, resistance to the other noise is increased. On the other hand, when the embedding intensity of digital watermark is "weak," by decreasing the quantization width, characteristics are exhibited that image quality is good; however, the probability is increased that a digital watermark per se is covered by other noise.

Therefore, in this embodiment, when the obtained tile includes a lot of high frequency components (i.e., when the image includes a lot of edge parts), the embedding intensity of digital watermark is set to "strong" since, for example, from general human visual perception characteristics, it is difficult for variation in edge parts to be conspicuous. Additionally, when the obtained tile does not include a lot of high-frequency components (i.e., when the image includes a lot of flat parts), the embedding intensity of digital watermark is set to "weak" since, for example, from general human visual perception characteristics, it is difficult for variation in flat parts to be conspicuous.

After setting the embedding intensity of digital watermark in the aforementioned manner, a process is carried out in step S5 that obtains digital watermark data stored in the digital watermark data storing unit 28 in accordance with the set embedding intensity of digital watermark, and embeds the obtained data into a wavelet coefficient. Here, the functions of digital watermark obtaining unit and digital watermark embedding unit are performed. In this embodiment, it is assumed that the subband that becomes the target into which a digital watermark is embedded is the same in all tiles.

In step S6, whether the processes of all tiles end is determined. When the decision result in step S6 is YES, the process ends. When the decision result in step S6 is NO, the process proceeds to step S7. In step S7, the next tile is obtained. The above-mentioned processes of steps S2 through S7 are repeated until the processes of all tiles end (YES in step S6).

Here, the characteristics of wavelet coefficients are extracted for each rectangular region dividing image data into one or a plurality of regions, the embedding specification of digital watermark data with respect to the wavelet coefficients is determined in accordance with the extracted characteristics of the wavelet coefficients of each rectangular region, and the digital watermark data are embedded into the wavelet coefficients for each rectangular region in accordance with the embedding specification of each rectangular region. Hence, in a case where a region that allows degradation of image quality caused by embedding a digital watermark and a region that does not are mixed in one image, it is possible to selectively vary the embedding specification of digital watermark data in the region that allows degradation of image quality and the region that does not.

According to this embodiment, the embedding intensity of digital watermark data with respect to a wavelet coefficient is determined in accordance with frequency components included in a rectangular region. That is, since it is difficult for variation in edge parts to be conspicuous for general human visual perception, many edge parts being included in high frequency components, in the case where a rectangular region includes a lot of high-frequency components, the embedding intensity of digital watermark data is increased compared with the case where the rectangular region includes a lot of low-frequency components.

Figure 10:
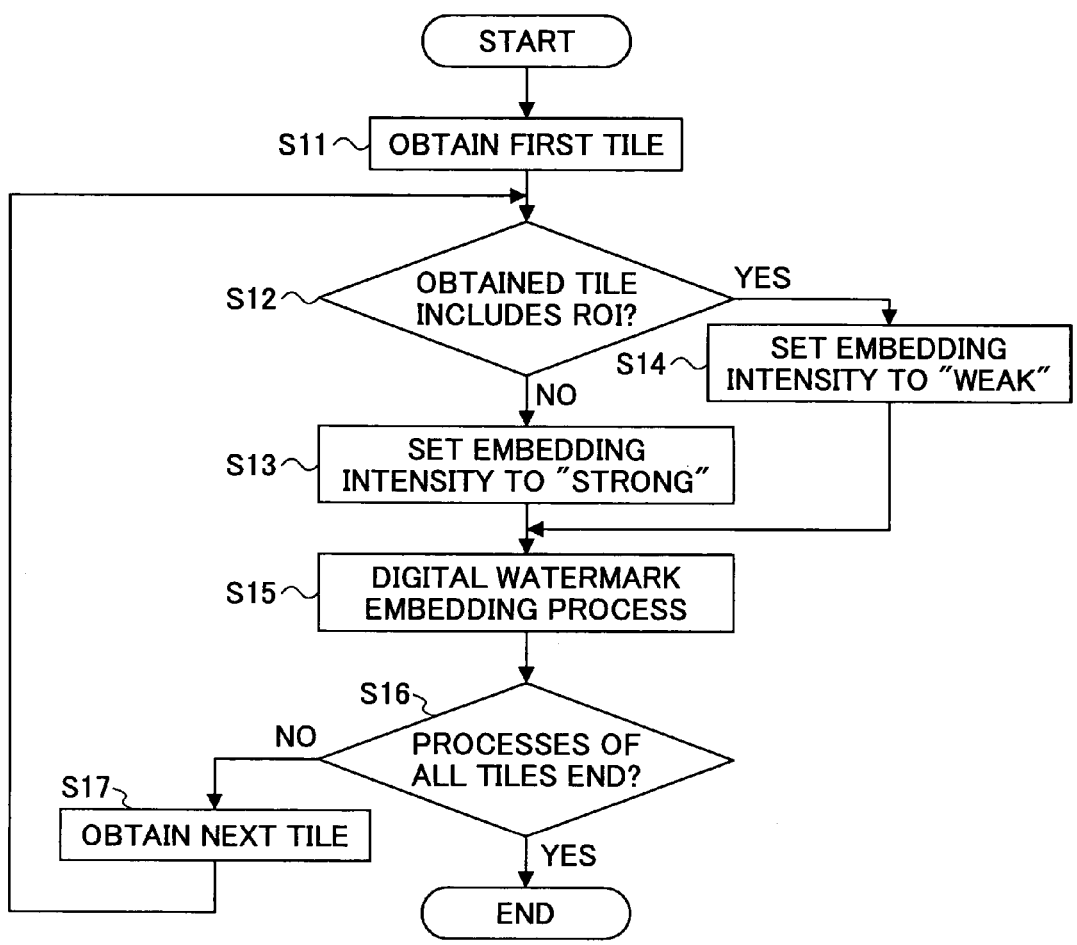
FIG. 10 is a flow chart for illustrating processes in the digital watermark embedding unit according to one embodiment of the present invention.

Next, referring to FIG. 10, a description is given of one embodiment of the present invention. In this embodiment, those parts that are the same as those corresponding parts in previously described embodiments are designated by the same reference numerals, and a description thereof is omitted (the same applies to the following embodiments). This embodiment is different from the previously described embodiments in the process performed by the digital watermark embedding unit 23.

In a previously described embodiment, whether each tile includes a lot of high-frequency components is determined. When a lot of high-frequency components are included, the embedding intensity of digital watermark is set to "strong," and when a lot of high-frequency components are not included, the embedding intensity of digital watermark is set to "weak." In the one embodiment, whether each tile includes a ROI (region of interest) is determined. When the ROI is not included, the embedding intensity of digital watermark is set to "strong." When the ROI is included, the embedding intensity of digital watermark is set to "weak." The ROI refers to a part of an entire image that is abstracted from the image and enlarged, or enhanced compared to the other parts. ROI is a technique for relatively improving the image quality of a part compared to that of the other parts. Since the technique is well known, a description thereof is omitted.

Referring to the flow chart shown in FIG. 10, a description is given of processes in the digital watermark embedding unit 23, which fulfills functions characteristic of this embodiment. As shown in FIG. 10, in step S11, a first tile is obtained from those tiles that are subjected to two-dimensional wavelet transform by the two-dimensional wavelet transform unit 22. Then, the process proceeds to step S12.

In step S12, it is determined whether the obtained tile includes a ROI. Here, the function of the characteristics extracting unit is performed.

When the obtained tile does not include a ROI (NO in step S12), the process proceeds to step S13. In step S13, the embedding intensity of digital watermark is set to "strong." On the other hand, when the obtained tile includes a ROI (YES in step S12), the process proceeds to step S14. In step S14, the embedding intensity of digital watermark is set to "weak." That is, the functions of the embedding specification determination unit are carried out by the processes of steps S13 and S14.

In this embodiment, when the obtained tile does not include a ROI, the embedding intensity of digital watermark is set to "strong" since in that case image quality may be degraded to some extent. In addition, when the obtained tile includes an ROI, the embedding intensity of digital watermark is set to "weak" since the image quality of the tile is relatively improved compared to the other parts, and it is desirable to maintain the image quality.

After setting the embedding intensity of digital watermark in the aforementioned manner, a process is carried out in step S15 that embeds into a wavelet coefficient digital watermark data stored in the digital watermark data storing unit 28 in accordance with the set embedding intensity of digital watermark. Here, the functions of the digital watermark obtaining unit and the digital watermark embedding unit are carried out. In this embodiment, it is assumed that the subband that becomes the target into which a digital watermark is embedded is the same in all tiles.

In step S16, whether the processes of all tiles end is determined. When the decision result in step S16 is YES, the process ends. When the decision result in step S16 is NO, the process proceeds to step S17. In step S17, the next tile is obtained. The above-mentioned processes of steps S12 through S17 are repeated until the end of processing of all tiles (YES in step S16).

Here, the characteristics of wavelet coefficients are extracted for each rectangular region dividing image data into one or a plurality of regions, the embedding specification of digital watermark data with respect to the wavelet coefficients is determined in accordance with the extracted characteristics of the wavelet coefficients of each rectangular region, and the digital watermark data are embedded into the wavelet coefficients for each rectangular region in accordance with the embedding specification of each rectangular region. Hence, in a case where a region that allows degradation of image quality caused by embedding a digital watermark and a region that does not are mixed in one image, it is possible to selectively vary the embedding specification of digital watermark data in the region that allows degradation of image quality and the region that does not.

According to this embodiment, the embedding intensity of digital watermark with respect to a wavelet coefficient is determined depending on whether a rectangular region includes a ROI. That is, in the case where a rectangular region includes a ROI, the embedding intensity of digital watermark is weakened compared to the case where the rectangular regions does not include a ROI, since the image quality of the rectangular region is relatively improved compared with the other parts, and it is desirable to maintain the image quality.

Additionally, in this embodiment, in the case where a tile includes a ROI, the embedding intensity of digital watermark is set to "weak" since the image quality of the tile is relatively improved compared with the other parts, and it is desirable to maintain the image quality. However, this is not a limitation. When a tile includes a ROI, in many cases, the tile may be important. Thus, when a tile includes a ROI, the embedding intensity of digital watermark may be set to "strong," and when a tile does not include a ROI, the embedding intensity of digital watermark may be set to "weak."

Figure 11:
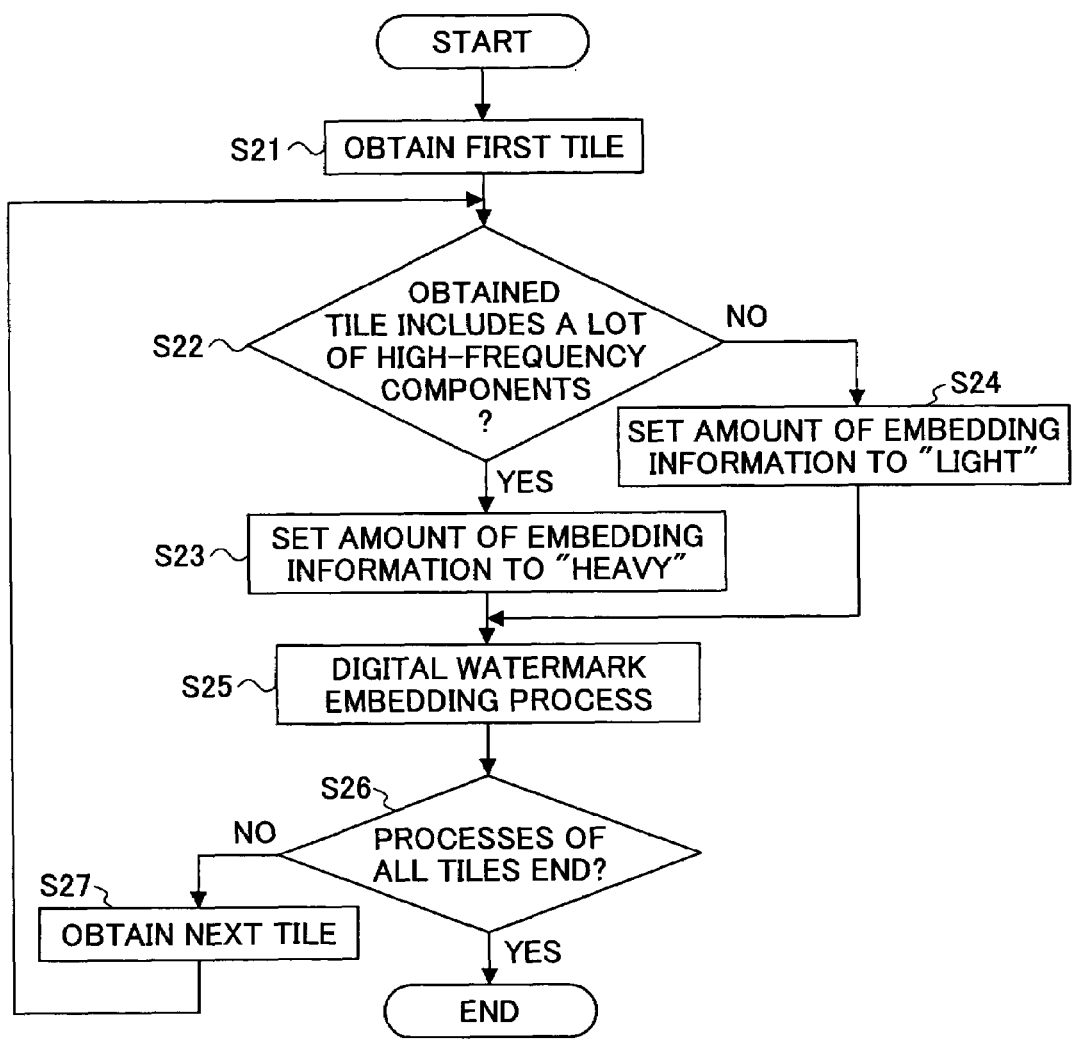
Figure 12:
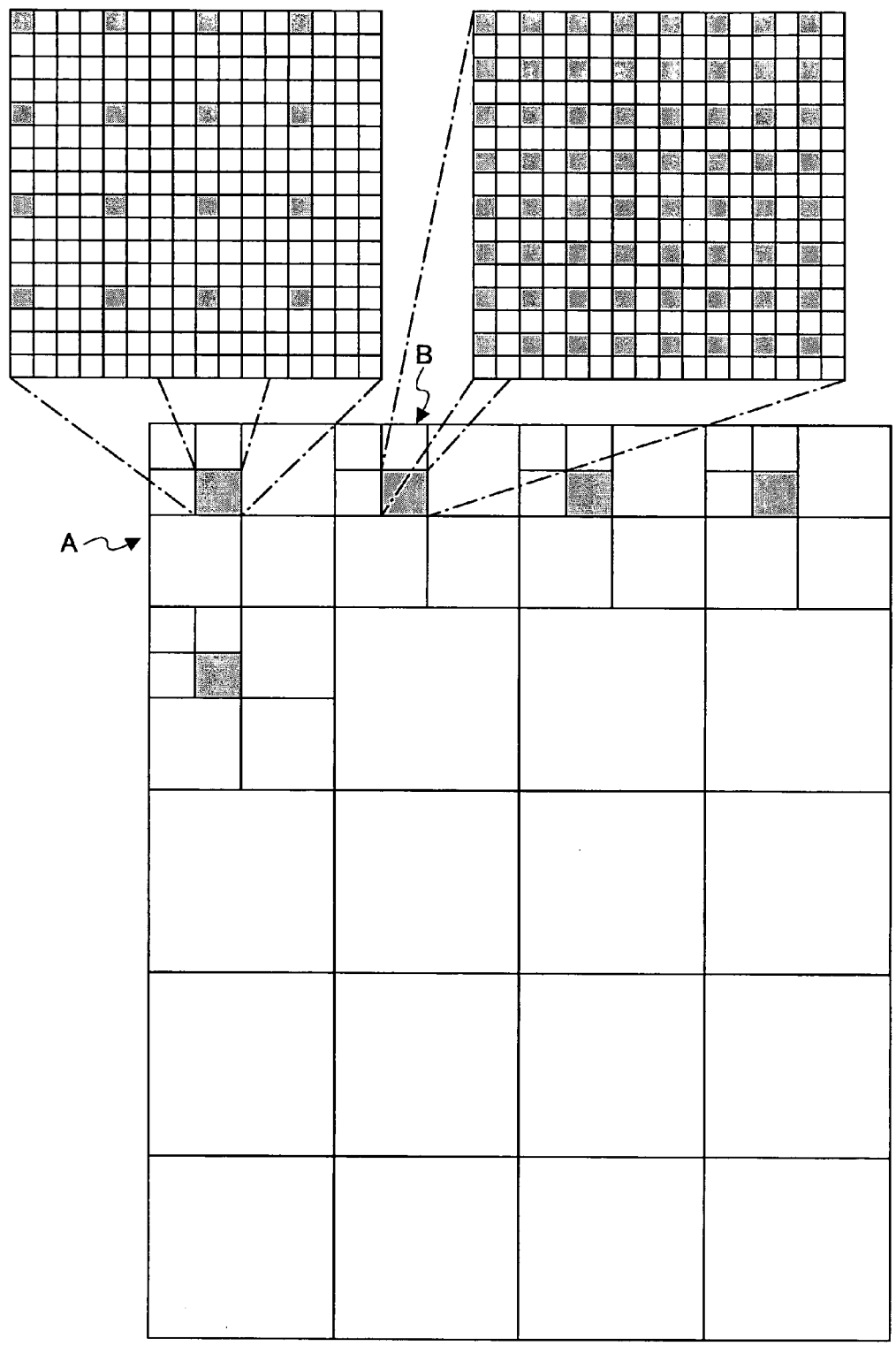
FIG. 12 is a schematic diagram for illustrating a technique for varying the amount of embedding information of digital watermark.

Referring to FIGS. 11 and 12, a description is given of another embodiment of the present invention. This embodiment is different from previous embodiments in the processes in the digital watermark embedding unit 23.

In one embodiment, whether each tile includes a lot of high-frequency components is determined. When a lot of high-frequency components are included, the embedding intensity of digital watermark is set to "strong." When a lot of high-frequency components are not included, the embedding intensity of digital watermark is set to "weak." In one embodiment, whether each tile includes a lot of high-frequency components is determined. When a lot of high-frequency components are included, the amount of embedding information of digital watermark is set to "heavy." When a lot of high-frequency components are not included, the amount of embedding information of digital watermark is set to "light."

Here, referring to the flow chart shown in FIG. 11, a description is given of processes in the digital watermark embedding unit 23, which fulfills functions characteristic of this embodiment. As shown in FIG. 11, in step S21, a first tile is obtained from those tiles that are subjected to two-dimensional wavelet transform by the two-dimensional wavelet transform unit 22. Then, the process proceeds to step S22.

In step S22, it is determined whether the obtained tile includes a lot of high-frequency components. Here, the function of characteristics extraction units is performed.

When the obtained tile includes a lot of high-frequency components (YES in step S22), the process proceeds to step S23. In step S23, the amount of embedding information of digital watermark is set to "heavy." On the other hand, when the obtained tile does not include a lot of high-frequency components (NO in step S22), the process proceeds to step S24. In step S24, the amount of embedding information of digital watermark is set to "light." In other words, the functions of embedding specification determination unit are carried out by the processes of steps S23 and S24.

Here, referring to FIG. 12, a description is given of a technique for varying the amount of embedding information of digital watermark. As shown in FIG. 12, in a tile A, for example, the amount of information for 16 bits is embedded therein by varying the coefficients of 16 parts. On the other hand, in a tile B, the amount of information for 64 bits is embedded therein by varying the coefficients of 64 parts. In this manner, the amount of embedding information of digital watermark is varied. When the amount of embedding information of digital watermark is "heavy," characteristics are exhibited that the noise of a digital watermark per se degrades the image quality; however, the resistance to the other noise is increased. On the other hand, when the amount of embedding information of digital watermark is "light," characteristics are exhibited that the image quality is good; however, the probability is increased that a digital watermark per se is covered by other noise.

Therefore, in this embodiment, when the obtained tile includes a lot of high-frequency components (i.e., when an image includes a lot of edge parts), the amount of embedding information of digital watermark is set to "heavy" since, for example, it is difficult for variation in the edge parts to be conspicuous for general human visual perception. In addition, when the obtained tile does not include a lot of high-frequency components (i.e., when an image includes a lot of flat parts), the amount of embedding information of digital watermark is set to "light" since, for example, variation in flat parts tends to be conspicuous for general human visual perception.

After setting the amount of embedding information of digital watermark in the aforementioned manner, a process is carried out in step S25 that embeds into wavelet coefficients digital watermark data stored in the digital watermark data storing unit 28 in accordance with the set amount of embedding information of digital watermark. Here, the functions of the digital watermark obtaining unit and the digital watermark embedding unit are carried out. In this embodiment, it is assumed that the subband that becomes the target into which a digital watermark is embedded is the same in all tiles.

In step S26, whether the processes of all tiles end is determined. When the decision result in step S26 is YES, the process ends. When the decision result in step S26 is NO, the process proceeds to step S27. In step S27, the next tile is obtained. The above-mentioned processes of steps S22 through S27 are repeated until the processes of all tiles end (YES in step S26).

Here, the characteristics of wavelet coefficients are extracted for each rectangular region dividing image data into one or a plurality of regions, the embedding specification of digital watermark data with respect to the wavelet coefficients is determined in accordance with the extracted characteristics of the wavelet coefficients of each rectangular region, and the digital watermark data are embedded into the wavelet coefficients for each rectangular region in accordance with the embedding specification of each rectangular region. Hence, in a case where a region that allows degradation of image quality caused by embedding a digital watermark and a region that does not are mixed in one image, it is possible to selectively vary the embedding specification of digital watermark data in the region that allows degradation of image quality and the region that does not.

According to this embodiment, the amount of embedding information of digital watermark data with respect to wavelet coefficients is determined in accordance with frequency components included in a rectangular region. That is, in the case where a rectangular region includes a lot of high-frequency components, the amount of embedding information of digital watermark data is increased compared to the case where low-frequency components are included, since, for example, in that case it is difficult for variation in edge parts to be conspicuous for general human visual perception.

Figure 13:
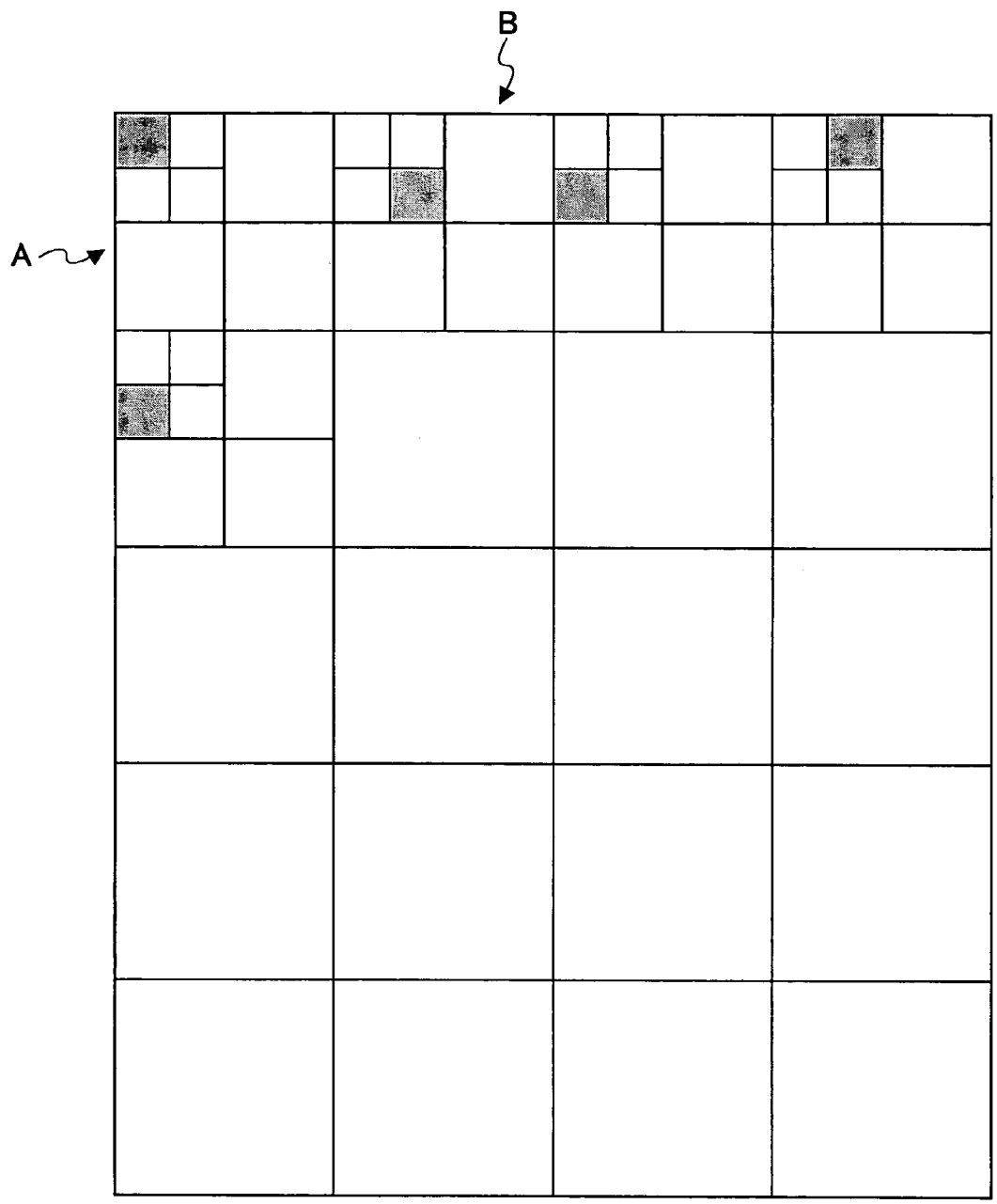
FIG. 13 is a schematic diagram for illustrating a technique for varying, for each tile, the subband that becomes the target into which digital watermark data are embedded.

In each of the above-mentioned embodiments, it is assumed that the subband that becomes the target into which digital watermark data are embedded is the same in all tiles. However, the subband that becomes the target into which digital watermark data are embedded may be varied for each tile. As shown in FIG. 13, for example, digital watermark data may be embedded into a subband 2LL in a tile A, and digital watermark data may be embedded into a subband 2HH in a tile B. In this manner, the subband that becomes the target into which digital watermark data are embedded may be varied for each tile.

In JPEG 2000, HH refers to data of a high-frequency component in the horizontal and vertical directions. LL refers to data of a low-frequency component in the horizontal and vertical directions. LH refers to data of a low-frequency component in the horizontal direction and high-frequency component in the vertical direction. HL refers to data of a high-frequency component in the horizontal direction and low-frequency component in the vertical direction. If image quality is important, it is possible to reduce degradation of image quality by embedding digital watermark data into the wavelet coefficients of HH, which is a high-frequency component, since degradation of image quality at decoding is small in a high-frequency component. In addition, in the case of a moving image, characteristics are observed that a high-frequency component in the horizontal direction is increased when a camera or an object of shooting is moving in the horizontal direction. Hence, the HL and HH components become greater than the LL and LH components. Accordingly, in such a case, it is possible to reduce degradation of image quality by embedding digital watermark data into the wavelet coefficients of the HL component or the HH component, which are high-frequency components.

Figure 14:
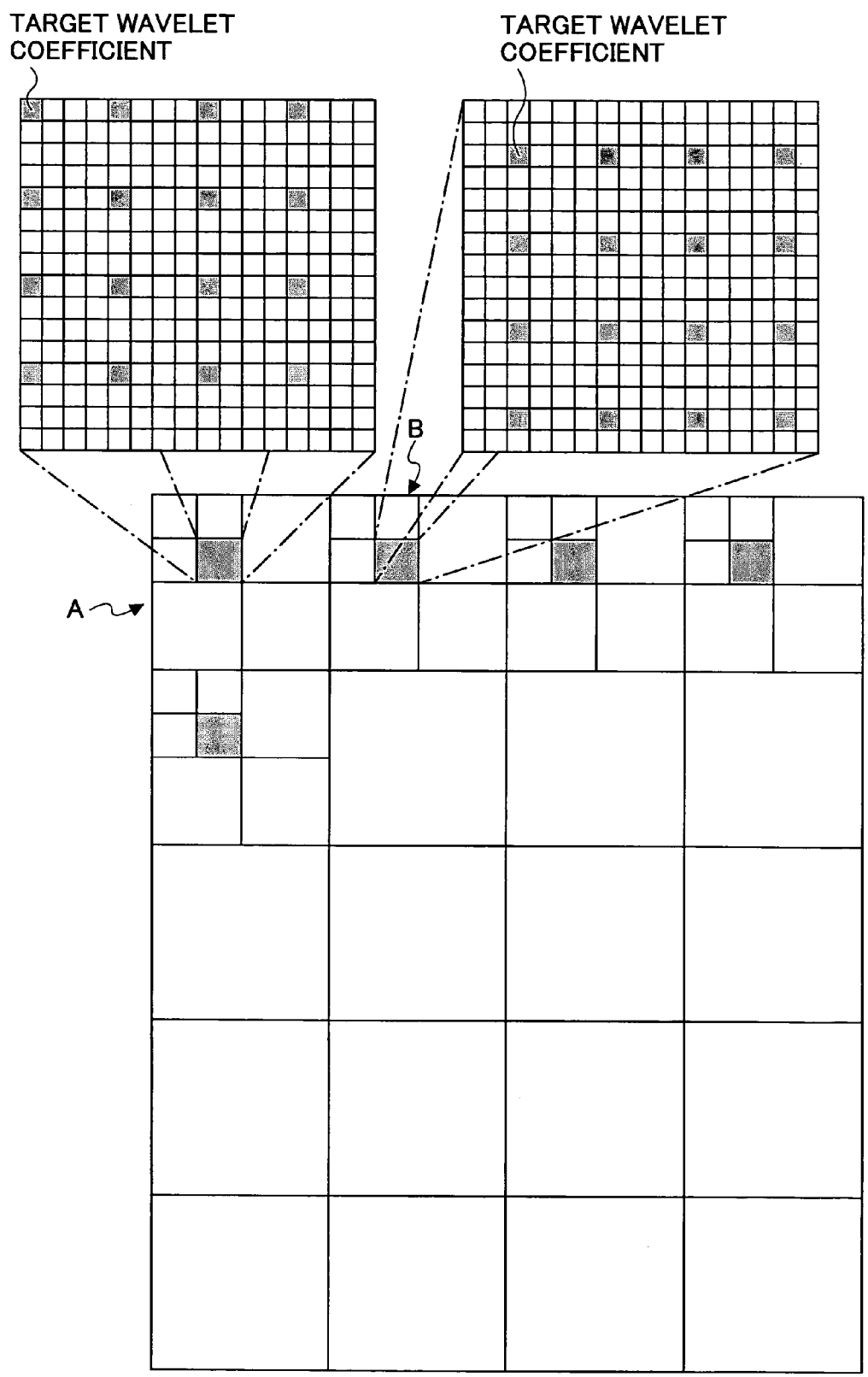
FIG. 14 is a schematic diagram for illustrating a technique for varying, for each tile, the wavelet coefficients that become the targets into which digital watermark data are embedded.

Additionally, as shown in FIG. 14, the wavelet coefficients that become the targets into which digital watermark data are embedded (target wavelet coefficients) may be varied for each tile. In this case, it is possible to increase confidentiality.

Further, of course, the subband that becomes the target into which digital watermark data are embedded may be varied for each tile, and the wavelet coefficients that become the targets into which the digital watermark data are embedded may also be varied for each tile, though illustration thereof is omitted.

The present invention is not limited to the specifically disclosed embodiments, and variations and modifications may be made without departing from the scope of the present invention.

The present application is based on Japanese priority application No. 2003-007106 filed on Jan. 15, 2003, the entire contents of which are hereby incorporated by reference.

What is claimed is:

1. An image processing apparatus, comprising:
a characteristics extracting unit to extract characteristics of wavelet coefficients of one or a plurality of rectangular regions dividing an image, wherein the characteristics of wavelet coefficients extracted by the characteristics extracting unit are based on the frequency components included in each of the rectangular regions;
an embedding specification determination unit to determine, in accordance with the extracted characteristics of the wavelet coefficients for each rectangular region, an embedding specification of digital watermark data with respect to the wavelet coefficients,
wherein when a rectangular region includes a lot of high frequency components, the embedding specification determination unit determines that an amount of embedding information of the digital watermark data is heavy,
when the rectangular region does not include a lot of high frequency components, the embedding specification determination unit determines that an amount of embedding information of the digital watermark is light,
and the embedding information to include a greater amount of the digital watermark data in a first high frequency component in horizontal and vertical directions than a low frequency component in a horizontal direction and a second high frequency component in a vertical direction; and
a digital watermark embedding unit to embed the digital watermark data into the wavelet coefficients for each rectangular region in accordance with the embedding specification of each rectangular region.

2. The image processing apparatus as claimed in claim 1, wherein the amount of embedding information of the digital watermark data is varied.

3. An image processing method comprising:
extracting characteristics of wavelet coefficients of one or a plurality of rectangular regions dividing an image, wherein the extracted characteristics of wavelet coefficients are based on the frequency components included in each of the rectangular regions;
determining, in accordance with the extracted characteristics of the wavelet coefficients for each rectangular region, an embedding specification of digital watermark data with respect to the wavelet coefficients, wherein determining an embedding specification of digital watermark data with respect to the wavelet coefficients comprises determining that an amount of embedding information of the digital watermark data is heavy when a rectangular region includes a lot of high frequency components, determining that an amount of embedding information of the digital watermark is light when the rectangular region does not include a lot of high frequency components, and the embedding information to include a greater amount of the digital watermark data in a first high frequency component in horizontal and vertical directions than a low frequency component in a horizontal direction and a second high frequency component in a vertical direction; and
embedding the digital watermark data into the wavelet coefficients for each rectangular region in accordance with the embedding specification of each rectangular region.

4. The image processing method as claimed in claim 3, wherein the amount of embedding information of the digital watermark data is varied.

* * * * *